Jan. 24, 1961 E. C. RANEY 2,969,087
VALVE MECHANISM
Filed Oct. 19, 1954

INVENTOR.
ESTEL C. RANEY
BY
ATTORNEY

United States Patent Office 2,969,087
Patented Jan. 24, 1961

2,969,087

VALVE MECHANISM

Estel C. Raney, Fort Lauderdale, Fla., assignor to Ranco Incorporated, Columbus, Ohio, a corporation of Ohio Filed Oct. 19, 1954, Ser. No. 463,265

7 Claims. (Cl. 137—609)

The present invention relates to an improvement in pilot operated, poppet type, three-way valve mechanisms.

The principal object of the present invention is to provide a three-way valve mechanism including a valve chamber having a fluid inlet and two outlets and poppet type valve members for controlling the flow of fluid through the outlets alternately, the valve members being moved to close and open the outlets by means responsive to the pressure of fluid flowing through the valve chamber and controlled by a relatively low powered pilot device, such as a solenoid, and comprising a piston arranged to be moved by the pilot device into one of the outlets which functions as a cylinder for the piston so that it is acted upon by the flow through the outlet to open the valve member closing the other outlet.

Another object of the invention is to provide a new and improved valve of the type described in the preceding paragraph in which the piston moves with the first mentioned valve, and the outlet into which the piston is moved comprises the outlet closed by the first mentioned valve member, the piston being connected with the second mentioned valve member by lost motion mechanism whereby the latter valve member is acted upon by the piston only after it has entered the outlet.

Figure 1:
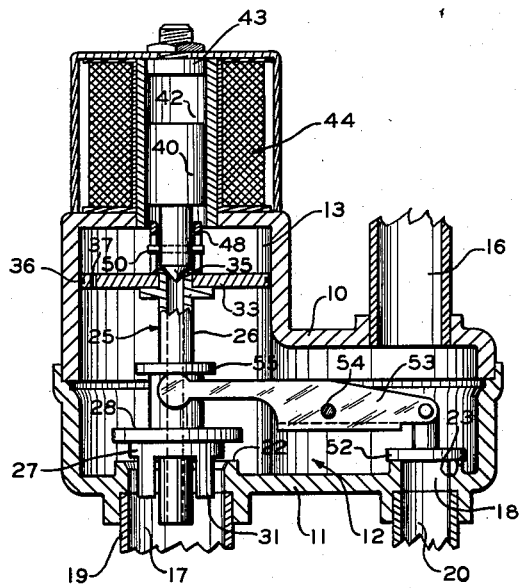
Figure 2:
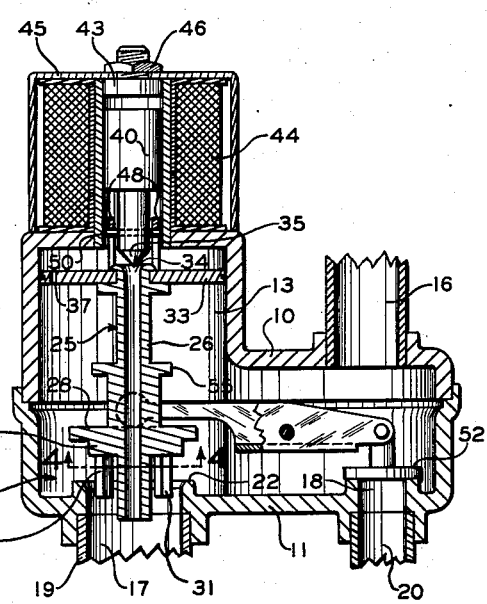
Figure 3:
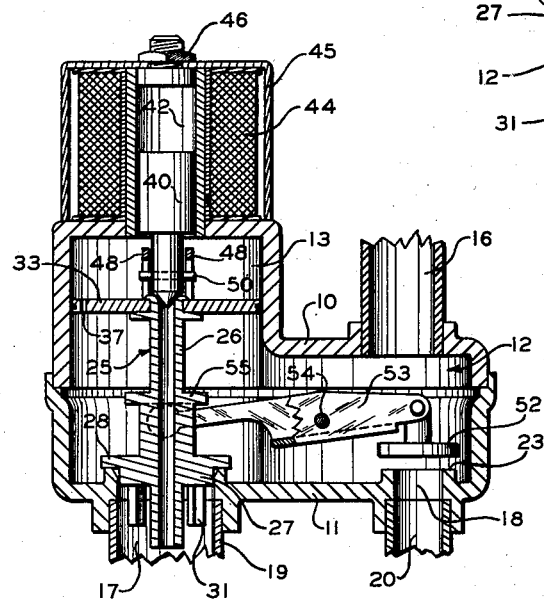
Figure 4:
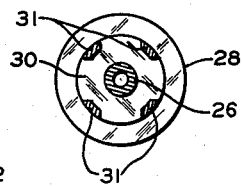

Other objects and advantages of the invention will be apparent from the following description of a preferred form of the invention, reference being made to the accompanying drawings wherein Figs. 1, 2 and 3 are vertical, sectional views of a three-way valve mechanism embodying the invention, and illustrating certain parts of the mechanism in different positions; and Fig. 4 is a sectional view taken on line 4—4 of Fig. 2.

Although the invention may be used in valves of various types, it is here shown embodied in a three-way valve mechanism, that is to say, a valve mechanism having an inlet adapted to be connected with a source of fluid under pressure, two outlets connected with lower pressure passages, and valve members for alternately closing the outlets to direct fluid through the other open outlet. The valve could, for example, be used in conjunction with other valves, such as check valves, to provide a flow reversing system, but since such valve arrangements are well known, they are not shown.

In the form shown, the valve mechanism comprises a casing formed of two complementary shell-like members 10, 11 hermetically joined about the open side edges thereof, as by brazing, and forming a valve chamber 12. The member 10 has a vertically extending cylinder 13 having one end opening into the chamber 12. The casing has an opening in which a pipe 16 is brazed to form an inlet to the valve chamber, and the lower wall of the casing has two outlet ports 17, 18 in which the ends of outlet pipes 19, 20 are attached respectively. The port 17 has a valve seat 22, the inner edge of which is chamfered, and port 18 has an upwardly facing valve seat 23.

The port 17 is adapted to be closed by a valve and piston assembly 25 which comprises a hollow stem 26 having a piston formation 27 at the lower end thereof which is adapted to enter the port which forms a cylinder in which the piston is actuated in one direction by pressure differential of fluid in the valve chamber and the outlet pipe 19. A flange 28 is formed at the top of the piston 27 and is adapted to act as a valve member and close on seat 22 to seal off the outlet 17 when the piston is in the position shown in Fig. 3. Preferably, the piston 27 has downwardly projecting fingers 31 which slide in the outlet port to form a guide means for directing the piston into the port, the space between the fingers forming fluid passages to the port when the piston is in its raised position, as seen in Fig. 2.

The upper end of stem 26 has a piston 33 attached thereto, which piston reciprocates in the cylinder 13, and the stem extends through an opening in the piston and the end opening thereof forms a valve seat 34 for a pilot valve member 35. The piston 33 has a suitable sealing ring 36 in a groove about the periphery thereof, and a bleed opening 37 therethrough the diameter of which is substantially less than the inside diameter of the stem 26.

The pilot valve member 35 is carried on an armature 40 which moves vertically in a sleeve 42 having its lower end brazed in an opening through the end wall of the cylinder 13 and its upper end closed by a plug 43. A suitable solenoid coil 44 is disposed about the sleeve 42 and is secured in place by a housing 45 attached to the sleeve by a nut 46 threaded on a stud projecting from the plug 43. The solenoid is adapted to be connected in a suitable control circuit not shown and when energized causes the armature 40 to raise and open valve seat 34, as seen in Fig. 2. When the solenoid is de-energized, the valve member 35 rests on seat 34 as shown in Figs. 1 and 3.

The piston 33 has a pair of stirrups or bails 48 attached thereto and disposed on opposite sides of the valve member 35 which are adapted to be engaged by a cross pin 50 secured in an opening through the valve member so that the assembly 25 may be held in a raised position by the armature 40 when the pilot valve 35 is removed from the seat 34, as seen in Fig. 2.

The port 18 is adapted to be closed by a valve member 52 which has a stem pivotally attached to one end of a channel shape beam 53, the beam being pivoted on a pin 54 journaled in the side walls of the valve casing. The opposite end of the beam 53 is forked and straddles the stem 26 which has a collar or flange 55 formed thereon which provides a stop or abutment adapted to engage the upper side of the left hand end of the beam when the valve and piston assembly 25 is lowered, to thereby raise the valve member 52 from its port, as seen by reference to Figs. 1 and 3. The position of the flange 55 on the stem is such that the assembly 25 may move downwardly from the position shown in Fig. 2, in which flange 28 engages the underside of the beam 53, to the position shown in Fig. 1 before the beam is engaged by the abutment 55. This lost motion between assembly 25 and the beam 53 permits the solenoid to hold the piston 27 above the influence of the stream of fluid entering port 17, as shown in Fig. 2, and to lower the piston substantially to the opening of the outlet, as seen in Fig. 1 in which the fluid pressure acts on the piston to force it into the outlet, at which time the beam 53 is engaged by abutment 55 and is moved by the piston 27 to lift valve member 52 from its seat, as seen in Fig. 3. The area of piston 27 is preferably larger than that of the port 18 so that the fluid in the chamber 12 exerts a greater force on the piston than on the valve member 52 and likewise the pivot pin 54 for the beam 53 may be located along the lever to give a leverage advantage to movement of the piston 27 in removing valve member 52 from its seat whereby the valve member 52 can be unseated by the pressure on piston 27.

The operation of the valve mechanism is as follows:

When the solenoid is de-energized, the valve members are in the positions shown in Fig. 3 with port 17 closed and port 18 open. The fluid pressure in the chamber 12 acts upon valve 28 to maintain that valve on its seat 22 and valve member 52 in the raised position so that fluid is discharged through port 18. Piston 33 is inoperative because the pressures on opposite sides thereof are equalized through the bleed passage 37, valve member 35 being closed on seat 34. To reverse the position of the valve members, the solenoid is energized which raises valve 35 from its seat thereby placing the upper end of the cylinder 13 in communication with the outlet pipe 19 which is at relatively low pressure so that the pressure above the piston 33 is reduced below that in the chamber 12 and the piston 33 therefore moves upwardly, raising the piston 27 and flange 28 from the port 17. The left hand end of beam 53 follows flange 55 upwardly due to the action of the fluid urging valve 52 to its port 23. The fluid pressures will be equalized on opposite sides of the piston 33 which neutralizes the piston, and the armature has sufficient pull to hold the assembly 25 in the raised position.

When the solenoid is de-energized the valve member 35 drops to close valve seat 34 and to lower piston 27 into the influence of the flow of fluid through port 17, as shown in Fig. 1. The pressure acting on the piston 27 forces it into the port until flange 28 rests on seat 22 which movement also tilts the beam 53 to raise the valve member 52 from its seat, as shown in Fig. 3.

It will be appreciated that the invention enables the pressure differentials in the fluid system controlled by the valve mechanism to be utilized to both open and close alternately acting poppet type valves whereby a relatively low power source such as the solenoid 44, can be used to control movement of the valve members.

While but one form of the invention has been disclosed, it is to be understood that other forms, modifications and adaptations could be made, all falling within the scope of the following claims.

I claim:

1. A valve mechanism comprising a valve chamber having a fluid inlet and two outlet ports, one of which is cylindrical, a piston movable freely in said chamber and adapted to enter said cylindrical port and substantially close said port and to move thereinto by pressure differential between said chamber and one port, a valve member for closing the other of said ports, means interconnecting said piston and valve member to cause said piston to move said valve member from said second port when said piston moves into said cylindrical port, said means interconnecting said piston and valve member including a lost motion connection permitting movement of said piston in said chamber to said cylindrical port while said valve member is closed on its port, and means to move said piston from said port.

2. A valve mechanism as defined in claim 1 in which said piston carries a valve member for closing on said cylindrical port and limiting movement of said piston into said cylindrical port.

3. A valve mechanism as defined in claim 1 in which the last mentioned means comprises a pressure actuated member actuated by fluid pressure in said chamber.

4. A valve mechanism as defined in claim 1 in which the means interconnecting the piston and valve member is a fulcrum lever having a lost motion connection with said piston for permitting movement of said piston relative to said valve member.

5. A valve mechanism as defined in claim 1 in which the effective area of the piston acted upon by fluid pressure is substantially greater than the effective area of the second mentioned port.

6. In a valve mechanism, a valve chamber having a fluid inlet and a pair of outlet ports, one of which ports leads into a fluid passage, a piston in said chamber adapted to enter said port and passage and to substantially close said passage whereby it is moved by fluid pressure into said passage, a valve member connected with said piston and adapted to close said one port when said piston moves a predetermined distance into said passage, a second valve member adapted to close the other of said outlet ports, means inter-connecting said piston and second valve member for removing said second valve from said other port by movement of said piston into said passage, said means being inoperative through a substantial movement of said piston toward the entrance to said passage, and means to move said piston from said passage comprising a cylinder, a second piston in said cylinder connected to the first mentioned piston and having a greater effective area than the first mentioned piston, said one end of said cylinder being in communication with said chamber whereby one side of said second piston is subjected to the pressure in said chamber, means forming a restricted fluid path connecting the other end of said cylinder with said chamber to equalize pressure on the opposite side of said second piston, and means to selectively connect the other end of said cylinder with said passage beyond the first mentioned piston to thereby reduce the pressure in the other end of the said cylinder.

7. In a valve mechanism, a valve chamber having a fluid inlet and a pair of outlet ports, one of which ports leads into a fluid passage, a first piston in said chamber adapted to enter said port and passage and to substantially close said passage whereby it is moved by fluid pressure into said passage, a valve member connected with said piston and adapted to close said one port when said piston moves a predetermined distance into said passage, a second valve member adapted to close the other of said outlet ports, means inter-connecting said first piston and second valve member for removing said second valve from the other port by movement of said first piston into said passage, said chamber including a cylinder having its axis coaxial with that of said passage, a second piston in said cylinder, said second piston having a greater effective area than said first piston, a stem inter-connecting said second piston and said first piston and extending into said passage beyond said first piston, a fluid passageway through said stem for connecting the interior of said cylinder with said passage, a valve adapted to open and close one end of said opening through said stem, means forming a relatively restricted fluid passageway from one side to the other of said second piston, said restricted passage being of less flow capacity than said opening through said stem, and means to actuate said valve.

References Cited in the file of this patent

UNITED STATES PATENTS

| | | |
|---|---|---|
| 389,099 | Newman | Sept. 4, 1888 |
| 787,422 | Wolfe | Apr. 18, 1905 |
| 850,251 | Rawe | Apr. 16, 1907 |
| 1,114,431 | Bopp | Oct. 20, 1914 |
| 1,960,144 | Entriken | May 22, 1934 |
| 1,989,341 | Shenton | Jan. 29, 1935 |
| 2,336,653 | Taylor | Dec. 14, 1943 |
| 2,379,181 | Pontius | June 26, 1945 |
| 2,446,910 | Dickens | Aug. 10, 1948 |
| 2,635,632 | Mayer | Apr. 21, 1953 |
| 2,640,494 | Kounovsky | June 2, 1953 |